Figure 4:
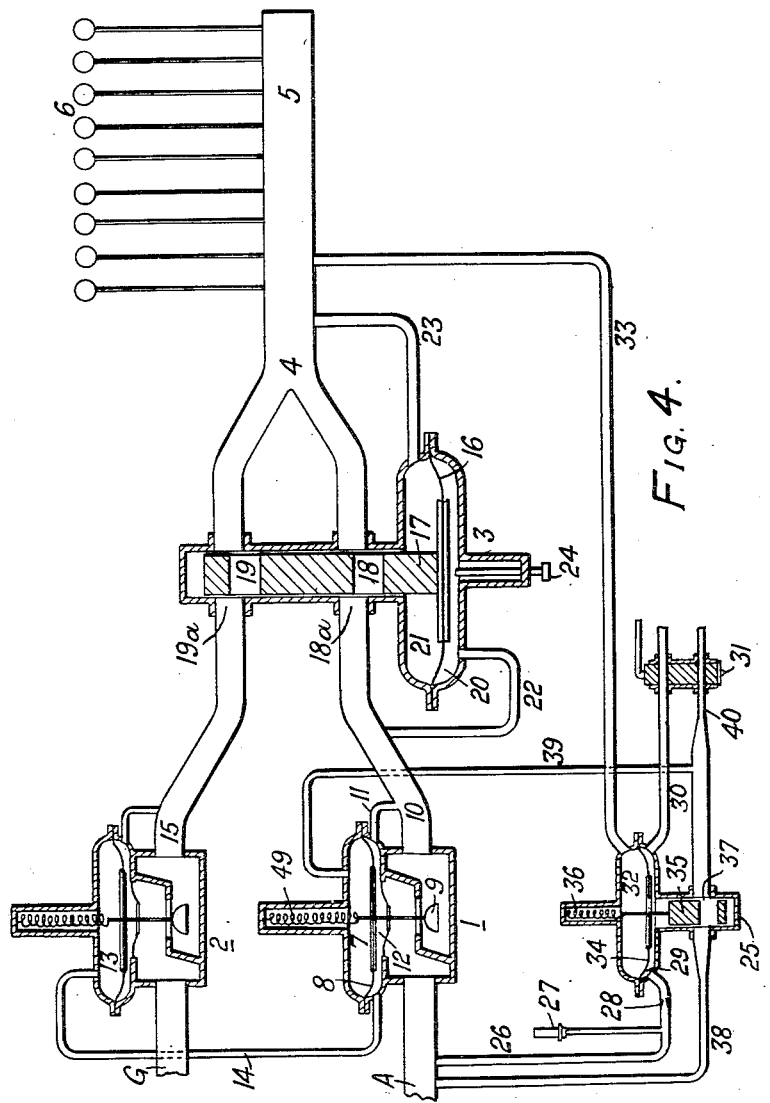

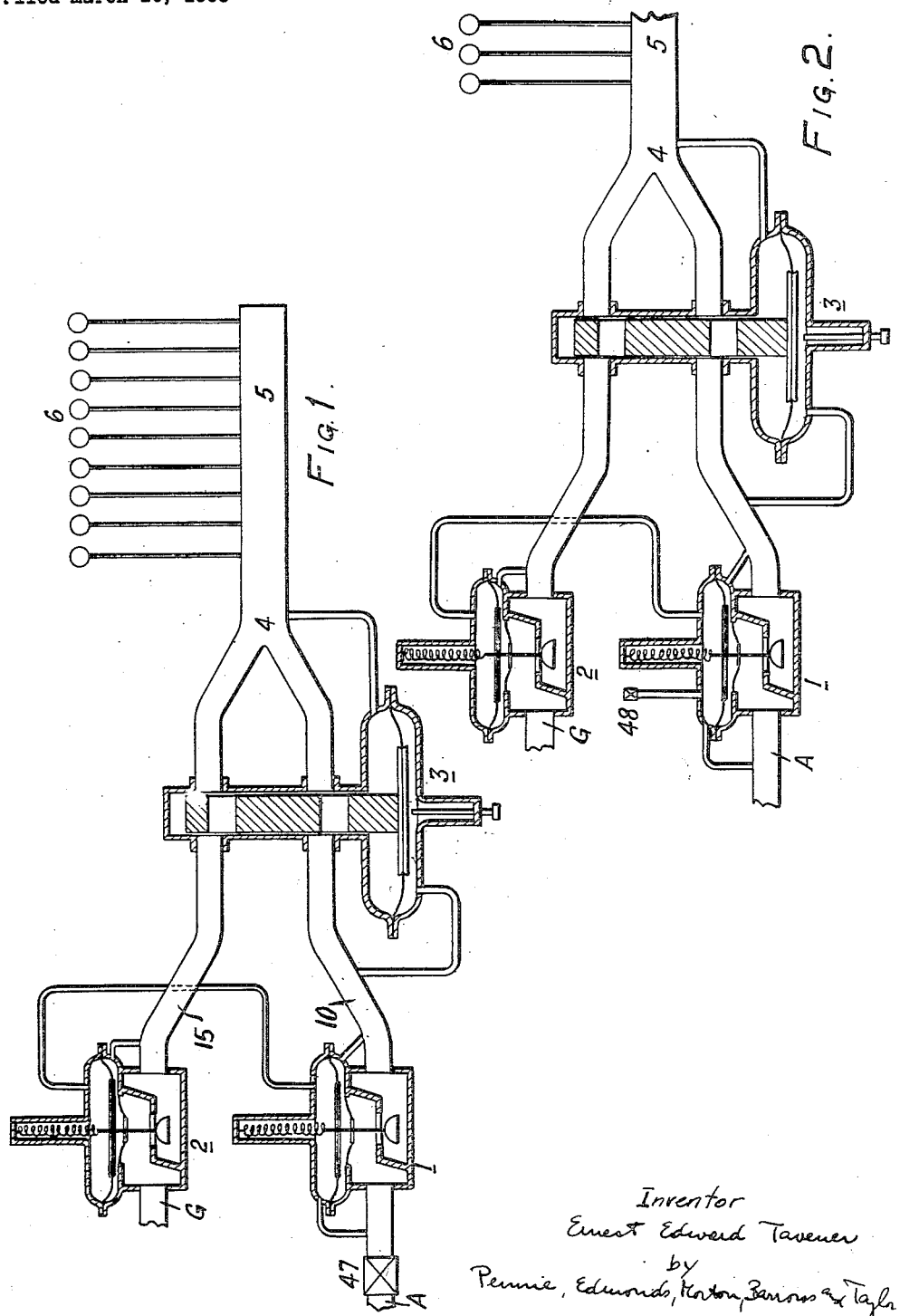

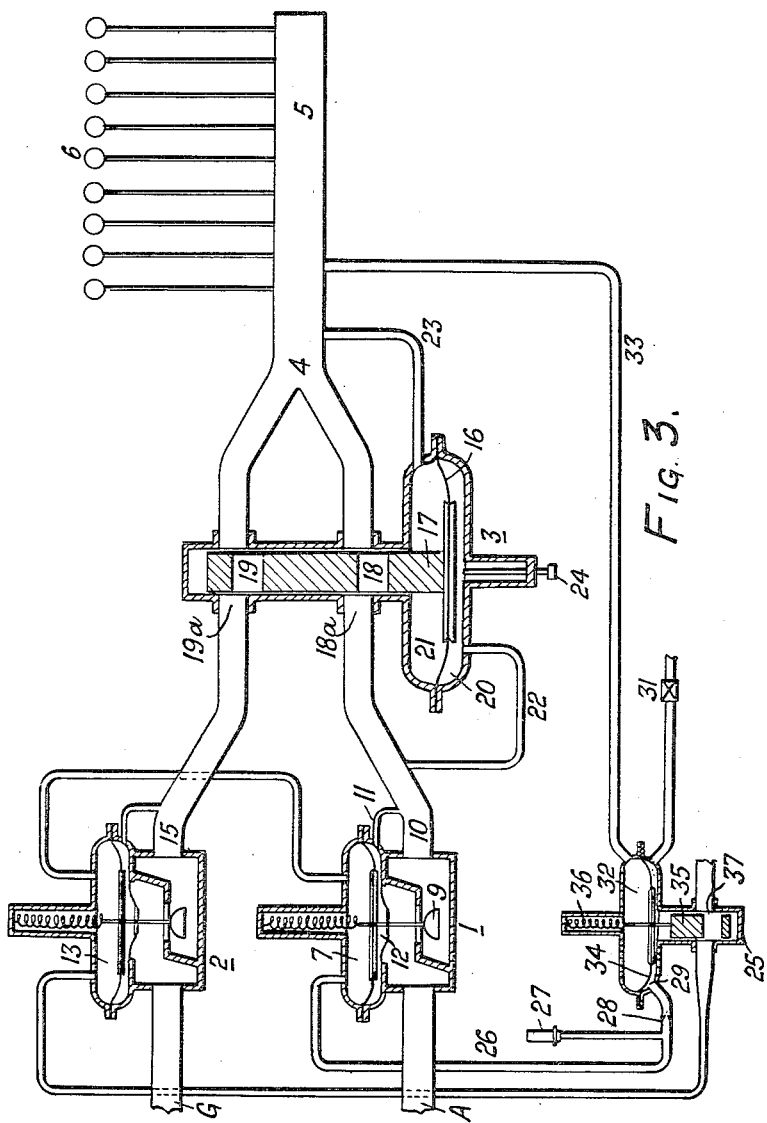

July 30, 1957 E. E. TAVENER 2,800,915
INSTALLATION FOR MIXING AERIFORM MEDIA
Filed March 10, 1953 4 Sheets-Sheet 3

Inventor
Ernest Edward Tavener
by Pennie, Edmonds, Morton, Barrows and Taylor
Attorneys

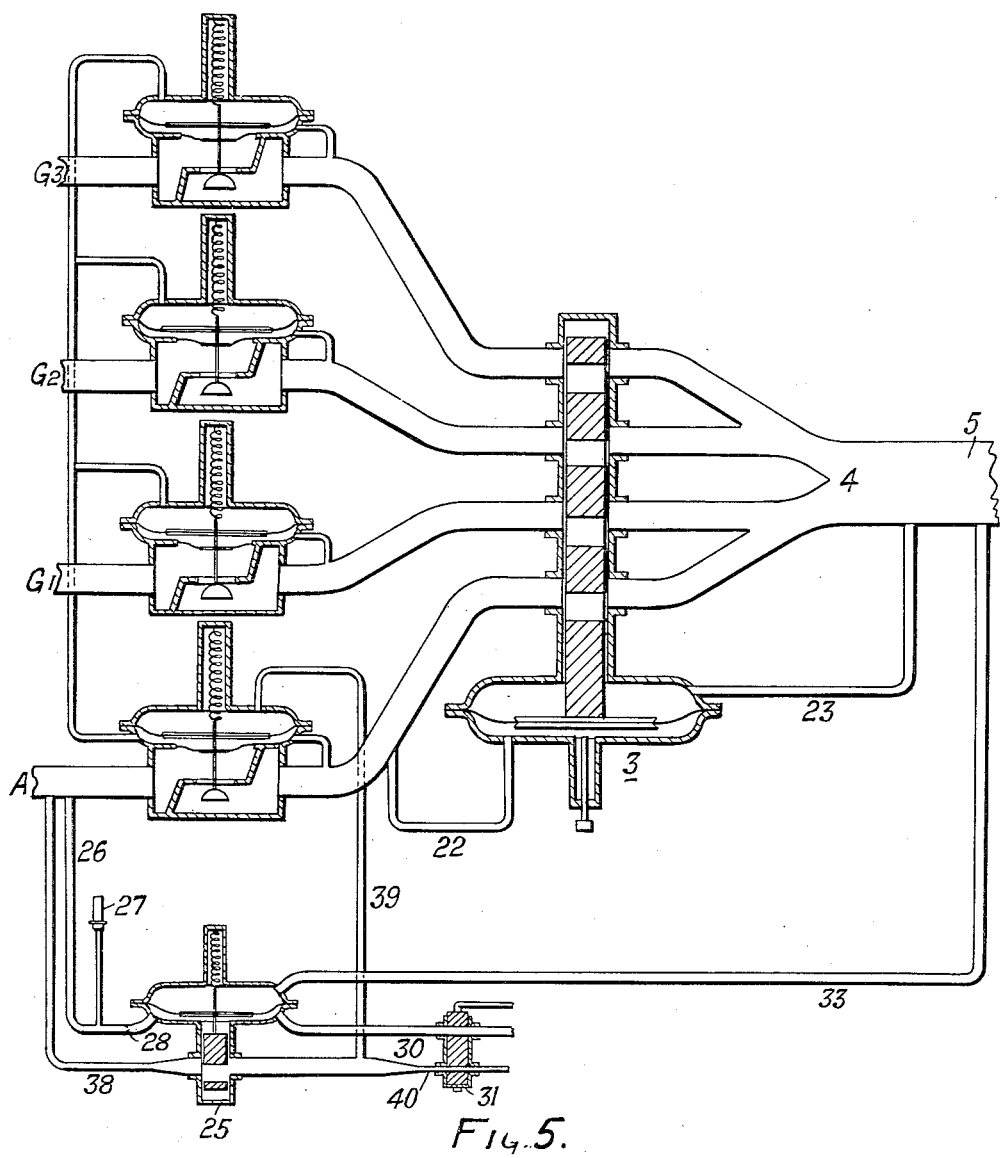

United States Patent Office 2,800,915
Patented July 30, 1957

2,800,915

INSTALLATION FOR MIXING AERIFORM MEDIA

Ernest Edward Tavener, Tottenham, London, England, assignor to Keith Blackman Limited, London, England, a corporation of Great Britain and Northern Ireland Application March 10, 1953, Serial No. 341,575

Claims priority, application Great Britain November 17, 1952

12 Claims. (Cl. 137—88)

This invention relates to an installation for effecting the admixture of aeriform media, hereinafter referred to as gas and air, of the type in which the two or more media are introduced through separate inlet conduits that merge into a common outlet conduit through which the mixture passes.

The invention contemplates a system of control of the pressures of the two or more media incorporating a pressure loaded governor or governors whereby the pressures of said media may be maintained equal and constant (if desired), means for causing the yet unmixed media on their way to the mixing point to undergo a pressure drop at chosen points, and connections for leading the media from these points to the mixing point and thence as a mixture to a consumer.

It will be convenient to assume that two media to be admixed are gas and air for combustion, in which case the consumer is a burner or burners.

Further, the system may include adjustable means to control the said pressure drop and to maintain said pressure drop substantially constant irrespective of changes in rates of flow; or manual or automatic control of pressure may be substituted for control of rates of flow.

Means may also be provided for stabilising the pressure of the mixed media in a header supplying a set of burners, so that such pressure, unless intentionally changed, is maintained constant irrespective of all variables.

The five figures of the accompanying drawings are schematic diamgrams of five installations according to the invention.

As illustrated by way of example in Figs. 1 and 2 of the drawings there is interposed between a pressure loaded governor or governors in the air pipe A and/or the gas pipe G, illustrated by the governors 1 and 2, and the mixing point 4 nozzles or restrictions as at 3, illustrated in the form of a ported piston controlled by a diaphragm, causing a pressure drop of sufficient magnitude to permit control to be established and to prevent possible differences of pressure on arrival at the mixing point 4, stopping or unduly affecting the flow of the medium which is at the lower pressure. If nozzles are fitted, either or both may be adjustable to permit the mixture ratio to be varied. Since the interposition of nozzles brings about a pressure drop, the pressure at the inlet sides 10, 15 to the nozzles exceeds the pressure on the outlet side at the mixing point 4.

It is preferred to use automatically adjustable nozzles giving substantially the same pressure drop for all volumes, as represented by a ported piston controlled by a diaphragm as at 3 in Figs. 1 to 5. Means may be provided for effecting manual adjustment to set the required mixture ratio.

When manual control of volume by the valve 47, Fig. 1, is resorted to, changes in the number of burners lit will cause considerable change in the pressure prevailing in the pipe 5; e. g., if eight burners 6 were in use at approximately half maximum pressure, and of four of them were turned out, the pressure may rise to, or approach the maximum, so that the reduction in heat input would be much less than would appear to be the case from the number of burners alight. By eliminating the control of volume, and substituting control of the pressure set up by the pressure-loaded governor by the valve 48, as in Fig. 2, considerable improvement results. The pressure control may be either manual or automatic, e. g., thermostatic.

A variable experienced when the number of burners alight is altered is caused by resistance in the piping between the header 5 and the outlets of the pressure-loaded governors 1, 2 and can be reduced or even eliminated by interposing an apparatus loaded by the pressure in the header 5, contrived in such a way that, should the pressure in the header 5 change, the loading of the pressure-loaded governor is automatically altered to provide compensation and thus bring the header pressure to the original value.

One solution of the problem illustrated in Fig. 3 is the fitment of a diaphragm governor 25 the upper side 32 of the diaphragm 34 of which communicates with the header 5 and to the underside 29 of the diaphragm of which is led air (or gas, whichever is used as controlling medium, or pressure fluid from an external source), the discharge from the governor 25 being preferably so regulated as to vary the pressure on the underside of the diaphragm. This diaphragm actuates the valve 35 which controls the pressure of the pressure-loaded gas governor. There is shown at 27 a dead weight valve for maintaining a constant pressure at its outlet and the restriction 28 causes a pressure drop according to the volume passing, which is determined by the valve 31, which may be operable manually or automatically. For the dead weight valve there may be substituted a system of restrictions, but whatever source of supply of pressure to the restriction 28 is used, it is preferable that the pressure shall remain constant.

Fig. 4 shows another arrangement for effecting the control.

Referring to Fig. 4, air and gas, both for instance under aproximately 1—1b pressure, enter at the points indicated at A and G and pass through respective pressure-loaded governors 1, 2, the outlet pressures from both governors being equal. Air and gas therein pass through the ported piston valve 3 which causes a pressure drop (e. g., 2" water gauge), and thence by way of the mixing point 4 to the header 5 which supplies the burners 6. The air is considered as the controlling medium and its outlet pressure is determined by the pressure prevailing in the compartment 7 above the diaphragm 8 controlling the governor 1. Assuming that this outlet pressure is at 10" water gauge, the diaphragm 8 will be urged downwards, thus opening the valve 9. When the outlet pressure in the pipe 10, which pressure is transmitted via the pipe 11 to the compartment 12 below the diapharm 8, reaches the same as that in the compartment 7, then the governor attains equilibrium and remains in equilibrium. A spring 49 serves to balance the weight of the diaphragm and valve parts. The compartment 12 communicates with the compartment 13 of the gas governor 2 through the pipe 14, thus maintaining the same pressure in the outlet pipe 15 as prevails in the outlet pipe 10, since the gas governor 2 operates in the same manner as the air governor 1.

The ported piston valve 3 comprises a diaphragm 16 and piston valve 17 which latter may conveniently be of adequate weight to provide the required loading on the diaphragm 16, such loading controlling the pressure drop across the valve. In the piston valve 17 are ports 18 and 19 which may be moved across corresponding ports 18a and 19a in the valve body. This movement of the valve relatively to the ports in the valve body is caused by the diaphragm 16 which is influenced by the pressure prevailing in the compartments 20, 21 above and beneath the diaphragm 16. If the dimensions are such that the pressure in the compartment 20 must be, say, 2" water gauge in excess of the pressure in the compartment 21 in order to lift the piston 17, then owing to this pressure being taken from the pipes 10 and 4 through the pipes 22, 23, it follows that there will be a 2" water gauge drop in pressure across the ported piston valve 3. If the pressure drop tends to exceed this figure, then the pressure difference between the compartments 20, 21 is increased, thus causing the diaphragm 16 to raise the piston 17 and unmask the ports 18, 19, thereby reducing the pressure drop across the valve 3 to the decided amount. A stop 24 may be fitted to prevent the piston 17 from masking the ports in the valve body completely in the descent of the diaphragm 16.

Manual adjustment of the port area may be resorted to, so that the mixture ratio may be set for all rates of flow, and when once this ratio is set, the proportionate areas of the two ports remain constant, although they are jointly unmasked or partially masked by the action of the diaphragm 16. If the setting is such that the air port is four times the area of the gas port, this proportion will be held whether the valve is fully opened or is at minimum opening.

The pressure prevailing in the compartment 7 of the air governor 1 which controls the outlet pressure in the pipe 10 is in turn controlled by means which is influenced by pressure in the pipe 5, and which is represented by the pressure governor 25. To the under side of the diaphragm 34 of the governor 25 a small supply is led from the air main through the pipe 26, the air acting on a dead weight valve 27 which maintains a constant pressure at the inlet to a restriction 28. (Any other suitable means of producing a constant pressure may be used.) Air which has passed the restriction 28 is admitted to the compartment 29 below the diaphragm 34 and discharged through the pipe 30 to the valve 31, the regulation of which determines the pressure set up in the compartment 29. The compartment 32 above the diaphragm 34 is connected to the mixture pipe 5 by a pipe 33. The weight of the diaphragm 34 and piston valve 35 is balanced by a spring 36. Thus, should the pressures in the compartments 29 and 32 differ from one another, the diaphragm 34 will be moved and thus, in turn, actuate the piston valve 35, thereby unmasking or masking the port 37 which controls the supply, through pipes 38, 39, to the compartment 7 of the air governor 1.

When the valve 31 is set manually or by automatic means, e. g., by a thermostat, then a certain pressure condition is set up in the valve 25 which under the control of the air governor 1 and the influence of the pressure in the mixture pipe 5 maintains a constant mixture pressure to the governors under all operating conditions. Naturally, pressure conditions in the pipe 5 may be varied by altering the setting of the valve 25 brought about by resetting of the valve 31.

The modification according to Fig. 5 is a development of the Fig. 4 arrangement and includes one air pipe A and three gas pipes G1, G2, and G3, respectively, each pipe being fitted with a pressure-loaded governor.

What is claimed is:

1. An installation for effecting the admixture of aeriform media, incorporating a supply duct for each aeriform medium, a common conduit for receiving the aeriform media from said supply ducts and into which said supply ducts are connected, a pressure-loaded governor controlling at least one of said supply ducts, said governor including a pressure-responsive control means, fluid-pressure-operated means for causing a constant pressure drop in said one supply duct irrespective of the rate of flow in said one supply duct downstream of said governor and for causing a constant pressure drop in each of the other supply ducts irrespective of the rate of flow in each of the other supply ducts, means for effecting communication between the pressure-responsive control means of the governor and the said one supply duct between the governor and the fluid-pressure-operated means for causing a pressure drop therein, and means effecting communication between the pressure-responsive control means of the governor and at least one of the other supply ducts upstream of the fluid-pressure-operated means for causing a pressure drop therein.

2. An installation as claimed in claim 1, including at least two supply ducts each of which is controlled by a pressure loaded governor.

3. An installation as claimed in claim 1, in which the fluid-pressure-operated means for causing a pressure drop in the supply ducts comprises a fluid-pressure-operated piston valve.

4. An installation as claimed in claim 1, including at least two supply ducts each of which is controlled by a pressure loaded governor, and means for adjusting the pressure set up in the supply duct controlled by one of the pressure loaded governors.

5. An installation as claimed in claim 1, including means responsive to the pressure in the common conduit for controlling the loading of the pressure loaded governor to stabilize the pressure in said common conduit.

6. An installation as claimed in claim 1, including a diaphragm governor responsive to the pressure in the common conduit for controlling the loading of the pressure loaded governor to stabilize the pressure in said common conduit.

7. An installation as claimed in claim 1, including means responsive to the pressure in the common conduit for controlling the fluid-pressure-operated means for causing a pressure drop in the supply ducts, whereby the pressure in said common conduit is stabilized.

8. An installation for effecting the admixture of aeriform media, incorporating a supply duct for each aeriform medium, a common conduit for receiving the aeriform media from said supply ducts and into which said supply ducts are connected, a pressure-loaded governor intercalated in each of said ducts, a diaphragm-operated piston valve intercalated in each of said supply ducts downstream of the pressure-loaded governor intercalated therein for causing a pressure drop in the supply duct, and a diaphragm governor responsive to the pressure in the common conduit controlling the loading of the pressure-loaded governors in the supply ducts, whereby the pressure in the common conduit is stabilized.

9. An installation as claimed in claim 8, including means for affecting communication between the diaphragm operated piston valve and said common conduit for regulating the pressure drop effected by the diaphragm operated piston valve.

10. An installation for effecting the admixture of aeriform media, incorporating a pair of supply ducts respectively for two aeriform media, a common conduit for receiving the aeriform media from said supply ducts and into which said supply ducts are connected, a pressure loaded governor intercalated in each of said supply ducts, said governor including a pressure-responsive control means, variable means for causing a pressure drop in each of said supply ducts downstream of the governor therein, means for effecting communication between the pressure-responsive control means of each governor and its supply duct between the governor and the means for causing a pressure drop, and means effecting communication between the pressure-responsive control means of each governor and one of said ducts upstream of the governor therein.

11. An installation as claimed in claim 10, including a diaphragm governor responsive to the pressure in the common conduit controlling the loading of the pressure loaded governors in the supply ducts, whereby the pressure in the common conduit is stabilized.

12. An installation as claimed in claim 10, including a diaphragm governor for controlling the variable means for causing a pressure drop in each of said supply ducts, and means for effecting communication between said diaphragm governor and said common conduit.

References Cited in the file of this patent
UNITED STATES PATENTS

| | | |
|---|---|---|
| 1,290,513 | Collins et al | Jan. 7, 1919 |
| 2,643,663 | Gold | June 30, 1953 |